C. M. HOFFMEYER.
EXCAVATING MACHINE.
APPLICATION FILED MAR. 24, 1917.
1,385,322.
Patented July 19, 1921.
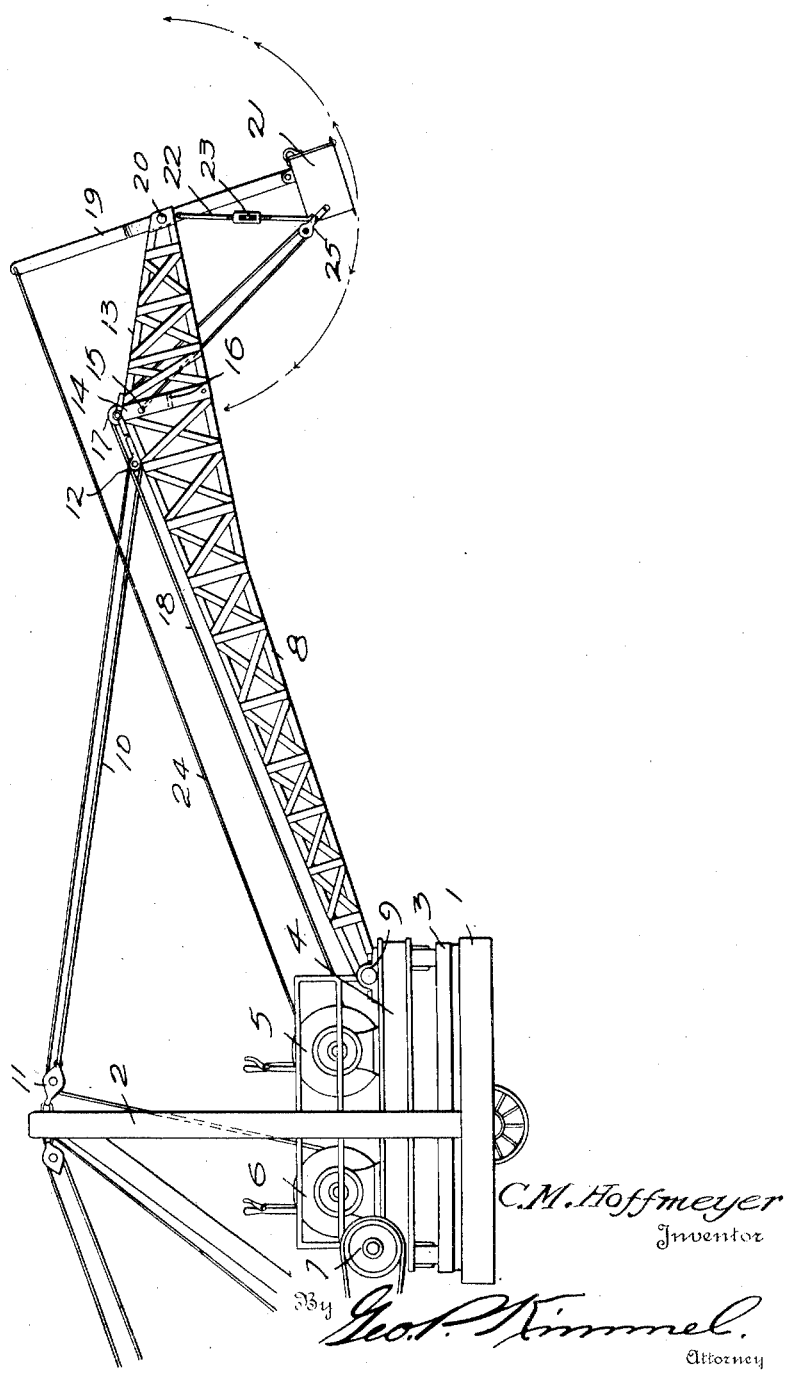

UNITED STATES PATENT OFFICE.

CONRAD M. HOFFMEYER, OF STRATFORD, ONTARIO, CANADA.

EXCAVATING-MACHINE.

1,385,322.   Specification of Letters Patent.   Patented July 19, 1921.

Application filed March 24, 1917. Serial No. 157,159.

*To all whom it may concern:*

Be it known that I, CONRAD M. HOFFMEYER, a subject of the King of Great Britain, and resident of Stratford, in the county of Perth, Province of Ontario, Dominion of Canada, have invented certain new and useful Improvements in Excavating-Machines, of which the following is a specification.

The present invention relates to excavating machines and has more especial reference to an improved steam shovel adapted for excavating, digging and like purposes. The invention has for its dominant object to provide an excavating machine wherein the boom is so mounted with relation to the shovel as to increase the digging power of the same during operation, hence, requiring but a minimum amount of power for moving the shovel into and through the earth or other object of work.

Another and equally important object of the invention is to provide an improved boom for the excavating machine, the same being braced in proximity of its free end to withstand shock and strain to which it will be subjected in operation and to evenly distribute such stress throughout the boom structure.

Another important feature of the invention resides in the specific mounting of the dipping arm and digging shovel, whereby the same will be moved inwardly during digging operations and as a consequence, will permit the weight of the boom to be directed thereonto during such movement. This permitting the engine to always move backwardly in the operation of my device, instead of forwardly as is customary with most similar types of machines. This permits the operator and mechanism to be above the work at all times and in front of the completed work. My device is adaptable to be attached to any type of tractor and is readily portable from place to place without the necessity for laying trackage.

Other independent objects are to provide features of construction of portions of the machine which tend toward the attainment of the above aims irrespective of the relation in which they are used.

Other objects will be in part obvious and in part pointed out hereinafter.

The invention accordingly consists in the features of construction, combination of elements and arrangements of parts which will be exemplified in the construction hereinafter set forth and the scope of the application of which will be indicated in the following claim.

In the accompanying drawings wherein is shown one of various possible embodiments of my invention, a side elevation thereof is disclosed, the body of the machine being fragmentally illustrated.

Similar reference characters refer to similar parts throughout the drawings.

Certain features and aims of this invention will be more clearly understood if the following facts be borne in mind: The majority of excavating machines now prevalent in the art, so far as I am informed, have the dipping arms and shovels thereof mounted in a manner to be swung outwardly from the boom of the machine and outwardly from the body of the machine and as a consequence, the final portion of the working stroke of the shovel is effected solely by the operating means engaged therewith and with the body of the machine, the boom serving for no other purpose than a means for supporting the dipping arm and shovel during its travel through the earth or other object of work. Obviously, such operation of the dipping arm and shovel require greater power and upon the termination of the working stroke of the shovel will impart abnormal thrust to the boom construction. With my improved arrangement of boom and dipping arm, the weight of the said boom is directed entirely onto the dipping arm during the digging or working stroke of the shovel carried thereby, thus, forcing the same firmly and positively into engagement with the earth, hence, requiring but a minimum amount of power and further, due to the inward swinging of the dipping arm, preventing the transmission of abnormal shock or strain to the boom construction.

The above are among the dominant aims of this invention, and are among others, attained in the constructions of the nature of that hereinafter described.

Referring now more specifically to the drawings there is shown a carriage designated 1 having a mast 2 arranged thereon. A platform 3 is supported upon the carriage 1 and has rotatably mounted thereon a turntable 4, the said table rotating about the lower portion of the mast 2 and having fixedly mounted thereon in spaced relation windlasses 5 and 6. A power transmitting shaft and pulley 7 is mounted upon one side of the turntable 4 and has connection with a suitable source of power, not shown, through the medium of belt gearing or the like. To normally maintain the mast 2 in upright position, truss lines and bars, may be and preferably are secured to the same adjacent its upper extremity and extended into engagement with suitable portions of the body of the excavating machine.

Upon the forward portion of the turntable 4 a trussed boom is pivotally mounted in bearings designated 9, the outer or free extremity thereof enlarging and being braced in a manner which will be presently described. A cable 10 having one end connected to the windlass 6 is extended over a pulley 11 arranged upon the upper end of the mast 2 and about a similar pulley 12 arranged in proximity of the outer end of the boom 8, and obviously, serves as means for permitting the raising and lowering of the said boom to the desired extent. The outer extremity of the upper longitudinal truss bar of the boom 8 extends diagonally downward as indicated by the numeral 13 from a point in proximity of the mounting of the pulley 12, while the outer extremity of the lower longitudinal truss bar of the said boom is extended downwardly from a point beyond that of the portion 13 and at a less acute angle. Thus, stress upon the outer end of the boom will be evenly distributed throughout its construction, particularly, due to the disalined junctions of the diagonally extended portions of the longitudinal trusses thereof. Those vertical truss elements indicated by the reference numeral 14 as arranged beneath the junction of the diagonally disposed portion 13 of the upper longitudinal trusses are of a width greater than the others and have mounted therebetween a rod 15 and a stop bar 16, the said stop bar serving as means for limiting the movement of travel of the dipper arm which will be subsequently described. A pulley 17 is arranged directly over the truss members 14 upon the upper longitudinal trusses and receives thereover a cable 18 extending from the windlass 5, which cable passes downwardly into engagement with the hereinafter referred to shovel and upwardly into engagement with the rod 15.

Upon the outer end of the boom 8 a dipping arm 19 having a bifurcated lower portion is pivotally mounted as at 20 and pivotally supports upon its lower end a conventional type of digging shovel 21, the said shovel being braced with relation to the lower extremity of the arm 19 by means of rods 22 having a turnbuckle 23 engaged with the adjacent screw threaded extremities thereof. To the upper end of the dipping arm 19 a cable 24 is engaged and is wound upon the windlass 5 in a direction opposite to the winding of the cable 18 thereabout. To permit engagement of the cable 18 with the shovel 21, a pulley 25 is preferably mounted upon the adjacent corner thereof and receives the same thereabout.

In operation the boom 8 is properly adjusted with relation to the earth or object of work whereupon the cable 18 is wound onto the windlass 5, thus, causing the shovel to be drawn downwardly into engagement with the earth, thus, scooping a certain amount of the same thereinto and raising it to a point whereat the dipping arm 19 will engage the stop 16 or will be in proximity thereto. During the working stroke of the shovel 21, the boom operating cable 10 is released from its windlass 6 to permit the weight of the boom to be directed thereonto, thus, lending to the digging power of the shovel and insuring positive engagement of the same with the earth or other object of work. When the shovel has been filled, the turntable 4 is rotated to cause the moving of the boom to a position to allow the discharge of dirt or other matter from the shovel 21 into a suitable conveyance or receptacle. To remove the shovel and the dipping means to their initial starting positions, the windlass 5 is now rotated in a direction to cause the winding of the cable 24 thereabout, whereupon the lower extremity of the dipping arm and the shovel will be swung outwardly to their normal positions.

Manifestly, the construction shown is capable of considerable modification and such modification as is within the scope of my claim, I consider within the spirit of my invention.

I claim:

An excavating machine including a trussed edgewise disposed boom adapted to be pivoted at one end to a supporting structure and enlarged in width near its free end with enlarged vertical brace bars at the limit of its enlargement, the upper edge of the free end of said boom being inclined downwardly from said enlarged braces and the lower edge of said boom being inclined downwardly from a point spaced inwardly from said braces to its free end and at an angle less acute than the upper inclined portion whereby the stress on the outer end of the boom will be evenly distributed throughout, a pulley carried by the boom at the upper end of said enlarged vertical bars, another pulley in the rear of said brace carried pulley and a digging shovel carried by the free end of said boom.

In testimony whereof I affix my signature hereto.

CONRAD M. HOFFMEYER.